(12) United States Patent
Choi et al.

(10) Patent No.: US 11,194,737 B2
(45) Date of Patent: Dec. 7, 2021

(54) STORAGE DEVICE, CONTROLLER AND METHOD FOR OPERATING THE CONTROLLER FOR PATTERN DETERMINATION

(71) Applicant: SK hynix Inc., Gyeonggi-do (KR)

(72) Inventors: Kwang-Ho Choi, Seoul (KR); Joong-Yong Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 36 days.

(21) Appl. No.: 16/665,373

(22) Filed: Oct. 28, 2019

(65) Prior Publication Data

US 2020/0310984 A1    Oct. 1, 2020

(30) Foreign Application Priority Data

Apr. 1, 2019 (KR) .................... 10-2019-0038087

(51) Int. Cl.
*G06F 12/00* (2006.01)
*G06F 12/123* (2016.01)
*G06F 13/00* (2006.01)
*G06F 13/28* (2006.01)

(52) U.S. Cl.
CPC .... *G06F 12/123* (2013.01); *G06F 2212/1044* (2013.01); *G06F 2212/608* (2013.01)

(58) Field of Classification Search
CPC ............. G06F 12/123; G06F 2212/608; G06F 2212/1044
See application file for complete search history.

(56) References Cited

U.S. PATENT DOCUMENTS

| | | | | |
|---|---|---|---|---|
| 5,768,548 | A * | 6/1998 | Young ................. | G06F 13/4059 710/306 |
| 8,880,844 | B1 * | 11/2014 | Bhattacharjee ..... | G06F 12/1027 711/205 |
| 2014/0129779 | A1 * | 5/2014 | Frachtenberg ........ | G06F 12/122 711/136 |
| 2018/0024932 | A1 * | 1/2018 | Nachimuthu ......... | G06F 3/0679 711/213 |
| 2019/0294376 | A1 * | 9/2019 | Park ....................... | G06F 3/064 |
| 2020/0065257 | A1 * | 2/2020 | Ghiggini ................. | G06F 12/10 |
| 2020/0218665 | A1 * | 7/2020 | Swaine ............... | G06F 12/0864 |

FOREIGN PATENT DOCUMENTS

| | | |
|---|---|---|
| KR | 10-2010-0082185 | 7/2010 |
| KR | 10-2015-0097981 | 8/2015 |

* cited by examiner

*Primary Examiner* — Mark A Giardino, Jr.
(74) *Attorney, Agent, or Firm* — IP & T Group LLP

(57) ABSTRACT

A controller suitable for controlling a semiconductor memory device includes a pattern determination circuit configured to determine a pattern information of data corresponding to a command received from a host. The controller includes a map cache management circuit configured to determine a target map table entry among map table entries of a map table based on the pattern information, and store, when the target map table entry does not exist in a map cache which stores some among the map table entries, the target map table entry in the map cache. The controller includes an entry eviction circuit configured to evict some among map table entries stored in the map cache, when storing the target map table entry in the map cache.

15 Claims, 8 Drawing Sheets

FIG.4

| Entry No. | Logical Address | Physical Address | Length |
|---|---|---|---|
| 0 | 0 | 10 | 32768 |
| 1 | 32768 | 10000 | 1 |
| 2 | 32769 | 10001 | 1 |
| 3 | 32770 | 10002 | 32 |
| 4 | 32802 | 10034 | 1 |
| 5 | 32803 | 10035 | 1 |
| 6 | 32804 | 10036 | 1 |
| ⋮ | ⋮ | ⋮ | ⋮ |

STORAGE DEVICE, CONTROLLER AND METHOD FOR OPERATING THE CONTROLLER FOR PATTERN DETERMINATION

CROSS-REFERENCE TO RELATED APPLICATION

The present application claims priority to Korean Patent Application No. 10-2019-0038087 filed on Apr. 1, 2019, which is incorporated herein by reference in its entirety.

BACKGROUND

1. Technical Field

Various embodiments generally relate to a storage device, a controller and a method for operating a controller.

2. Related Art

A storage device stores data based on a request of a host such as a computer and a smartphone. Such storage device may be of a type that stores data in a magnetic disk, such as a hard disk drive (HDD), or of a type that stores data in a nonvolatile memory, such as a solid state drive (SDD), a universal flash storage (UFS) device and an embedded MMC (eMMC) device.

A storage device includes a controller therein. The controller may receive a command from a host, and may execute operations for reading/writing data in the storage device based on a received request.

Various interfaces may be utilized for reading/writing data between the storage device and the host. One type of interface is nonvolatile memory express (NVMe). NVMe enables the host to access the storage device at a high speed through a PCIe (peripheral component interconnect express) serial bus.

SUMMARY

Various embodiments are directed to a storage device, a controller and a method for operating the controller capable of increasing the hit ratio of a map cache by using a pattern of data corresponding to a command received from a host.

Various embodiments are directed to a storage device, a controller and a method for operating the controller capable of maximizing the hit ratio of a map cache of limited size.

Various embodiments are directed to a storage device, a controller and a method for operating the controller capable of improving the performance of a map table through increasing the ratio of a size of a region to be mapped by the map table with respect to a size of the map table, by using a pattern of data corresponding to a command received from a host.

In one aspect, a controller to be described in embodiments of the disclosure may include a pattern determination circuit configured to determine a pattern of data corresponding to a command received from a host.

The controller may further include a map cache management circuit configured to determine a target map table entry among map table entries of a map table based on the pattern, and store, when the target map table entry does not exist in a map cache which stores some of the map table entries, the target map table entry in the map cache.

The controller may further include an entry eviction circuit configured to evict at least one among the map table entries in the map cache, when storing the target map table entry in the map cache.

In another aspect, a storage device to be described in embodiments of the disclosure may include a semiconductor memory device.

The storage device may further include a controller configured to control the semiconductor memory device, and the controller may include a pattern determination circuit configured to determine a pattern of data corresponding to a command received from a host.

The controller may further include a map cache management circuit configured to determine a target map table entry among map table entries of a map table based on the pattern information, and store, when the target map table entry does not exist in a map cache which stores some of the map table entries, the target map table entry in the map cache.

The controller may further include an entry eviction circuit configured to evict at least one among the map table entries in the map cache, when storing the target map table entry in the map cache.

In still another aspect, a method for operating a controller to be described in embodiments of the disclosure may include determining a pattern of data corresponding to a command received from a host.

The method may further include determining a target map table entry among map table entries of a map table based on the pattern information, and storing, when the target map table entry does not exist in a map cache which stores some of the map table entries, the target map table entry in the map cache.

The method may further include evicting at least one among the map table entries in the map cache, when storing the target map table entry in the map cache.

The command may include information indicating whether the pattern of the data corresponding to the command is a sequential pattern or not.

The target map table entry may include information on a physical start address and a mapping size of a mapping region corresponding to the target map table entry.

The evicting of the some among the map table entries in the map cache comprises evicting the at least one among the map table entries in the map cache, according to an eviction policy determined based on an input distribution of a plurality of commands received from the host during a specific time period.

In still another aspect, a storage device to be described in embodiments of the disclosure may include a memory device and a controller including a map cache.

The controller may receive, from a host, a command including a write command and a read command, data corresponding to the command, and pattern information indicating a pattern of the data.

The controller may generate a first map entry corresponding to the write command, based on the pattern information, and storing the first map entry in the map cache.

The controller may search for a second map entry corresponding to the read command from the map cache.

The controller may evict a map entry among a plurality of map entries, from the map cache, based on the pattern information.

The pattern information may indicate whether the data is sequential.

Embodiments of the disclosure may provide a storage device, a controller and a method for operating a controller capable of increasing the hit ratio of a map cache by using a pattern of data corresponding to a command received from a host. Particularly, embodiments of the disclosure may provide a storage device, a controller and a method for operating a controller capable of maximizing the hit ratio of a map cache having a limited size.

Also, embodiments of the disclosure may provide a storage device, a controller and a method for operating a controller capable of improving the performance of a map table through increasing the ratio of a size of a region to be mapped by the map table with respect to a size of the map table, by using a pattern of data corresponding to a command received from a host.

BRIEF DESCRIPTION OF THE DRAWINGS

FIG. 4 is a diagram illustrating an example of configuring a map table and map table entries in accordance with an embodiment.

DETAILED DESCRIPTION

A storage device, a controller and a method for operating a controller are described below with reference to the accompanying drawings through various embodiments.

Figure 1:
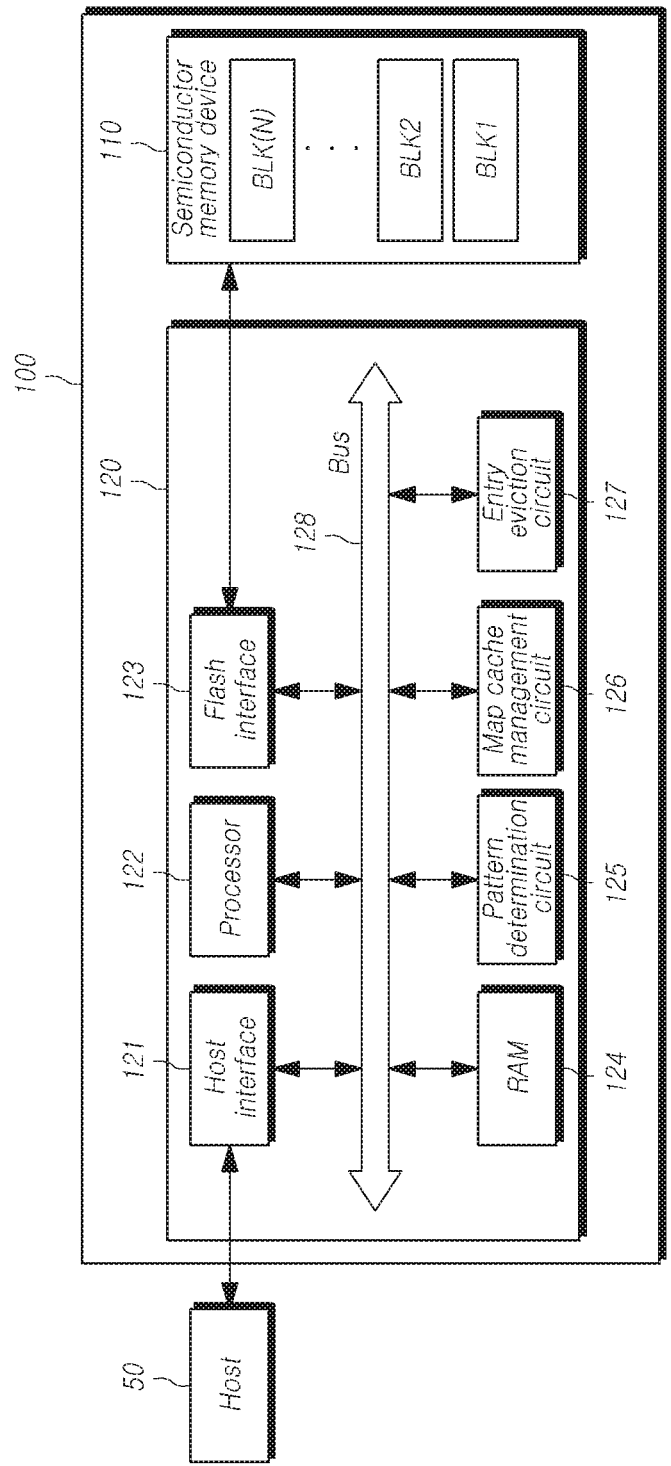
FIG. 1 is a diagram illustrating a storage device in accordance with an embodiment.

FIG. 1 is a diagram illustrating a storage device 100 in accordance with embodiments.

Referring to FIG. 1, the storage device 100 may include a semiconductor memory device 110 and a controller 120.

The semiconductor memory device 110 may store data. The semiconductor memory device 110 operates in response to the control of the controller 120. The semiconductor memory device 110 may include a memory cell array including a plurality of memory cells which store data.

The semiconductor memory device 110 may be a double data rate (DDR) synchronous dynamic random access memory (SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM) or a spin transfer torque random access memory (STT-RAM).

The semiconductor memory device 110 may be realized as a three-dimensional array structure. Embodiments of the disclosure may be applied to not only a flash memory device in which a charge storage layer is configured by a conductive floating gate (FG) but also a charge trap flash (CTF) in which a charge storage layer is configured by a dielectric layer.

The semiconductor memory device 110 is configured to receive a command and an address from the controller 120 and access a region selected by the address in the memory cell array. In other words, the semiconductor memory device 110 may perform an operation corresponding to the command, for a region selected by the address.

For example, the semiconductor memory device 110 may perform a program operation, a read operation and an erase operation. In the program operation, the semiconductor memory device 110 may program data to a region selected by the address. In the read operation, the semiconductor memory device 110 may read data from a region selected by the address. In the erase operation, the semiconductor memory device 110 may erase data stored in a region selected by the address.

The semiconductor memory device 110 may include therein a plurality of, e.g., N, memory blocks, where N is a natural number greater than 1. The N memory blocks may be designated by the reference symbols BLK1 to BLK(N), respectively.

The controller 120 may control the operation of the semiconductor memory device 110 according to a request of a host 50 or in the absence of a request of the host 50. For example, the controller 120 may control write, read, erase and background operations for the semiconductor memory device 110. For example, the background operation may be a garbage collection (GC) operation, a wear leveling (WL) operation, a bad block management (BBM) operation, or the like.

The controller 120 may include a host interface 121, a processor 122, a flash interface 123, a RAM 124, a pattern determination circuit 125, a map cache management circuit 126 and an entry eviction circuit 127. The host interface 121 provides an interface for communication with the host 50. When receiving a command from the host 50, the controller 120 may receive the command through the host interface 121, and then, may perform an operation of processing the received command.

The processor 122 may control general operations of the controller 120, and may perform a logic calculation. The processor 122 may communicate with the host 50 through the host interface 121, and may communicate with the semiconductor memory device 110 through the flash interface 123.

The processor 122 may perform the function of a flash translation layer (FTL). The processor 122 may translate a logical block address (LBA) provided by the host 50, into a physical block address (PBA), through the flash translation layer (FTL). The flash translation layer (FTL) may receive the logical block address (LBA) and translate it into the physical block address (PBA), by using a map table. There are various address mapping methods of the flash translation layer, depending on a mapping unit. Representative address mapping methods include a page mapping method, a block mapping method and a hybrid mapping method.

The processor 122 is configured to randomize data received from the host 50. For example, the processor 122 may randomize data received from the host 50, by using a randomizing seed. Randomized data as data to be stored is provided to the semiconductor memory device 110 and is programmed to the memory cell array.

The processor 122 is configured to derandomize data received from the semiconductor memory device 110, in a read operation. For example, the processor 122 may derandomize data received from the semiconductor memory device 110, by using a derandomizing seed. Derandomized data may be outputted to the host 50.

The processor 122 may drive firmware loaded in the RAM 124 upon booting to control general operations of the controller 120 and perform a logic calculation.

The flash interface 123 provides an interface for communication with the semiconductor memory device 110.

The RAM 124 may store firmware, program code, a command or data necessary to drive the controller 120, and may be an SRAM or a DRAM.

The pattern determination circuit 125 may determine pattern of data corresponding to a command received from the host 50.

For instance, the command received from the host 50 may be a nonvolatile memory express (NVMe) command.

The command received from the host 50 may include information indicating whether a pattern of data corresponding to the command is a sequential pattern. The pattern determination circuit 125 may determine a pattern of the data corresponding to the command based on the information from the host 50.

Data of a sequential pattern means data sequentially stored or to be sequentially stored according to at least one key field (i.e., address) in the storage device 100, and is not necessarily stored in a physically continuous space. The host 50 may transmit one or more segmented commands to the storage device 100 for a read/write operation for one continuous logical address region, and at this time, pattern information of data corresponding to the respective commands transmitted to the storage device 100 may indicate that a pattern of data is a sequential pattern.

On the other hand, data that is not a sequential pattern may be of a random pattern. Data of a random pattern means data stored or to be stored without a specific order in the storage device 100.

A large amount of data requiring processing at the same time may be managed as a sequential pattern to maximize data read/write performance, and other data may be managed as a random pattern for space utilization efficiency.

As an example of information indicating a pattern of data corresponding to a command, hint information included in a nonvolatile memory express command is described below with reference to FIG. 3.

The map cache management circuit 126 may select, based on a pattern of data (or information thereof) corresponding to a command received from the host 50, a target map table entry corresponding to the command among map table entries of the map table.

The map table as a table used for mapping between a logical block address (LBA) and a physical block address (PBA) in the flash translation layer (FTL) may also be referred to as a mapping table or a logical-to-physical (L2P) map table.

The map table is constituted by map table entries which indicate mapping between specific logical address regions and specific physical address regions. A physical address region mapped to a specific logical address region by a specific map table entry of the map table may be defined as a mapping region corresponding to the map table entry.

An example in which the map cache management circuit 126 determines a target map table entry depending on a command received from the host 50 is as follows.

For instance, in the case where a write command is received from the host 50, a map table entry for data corresponding to the received write command is added to the map table, and the map cache management circuit 126 may select the added map table entry as a target map table entry.

If a pattern of the data corresponding to the write command is a sequential pattern, the target map table entry may be configured such that the corresponding data is sequentially stored in the semiconductor memory device 110. If a pattern of the data corresponding to the write command is not a sequential pattern, the target map table entry may be configured such that the corresponding data is randomly stored in the semiconductor memory device 110.

For another instance, in the case where a read command is received from the host 50, an operation of searching for a map table entry for data corresponding to the received read command in the map table is performed, and the map cache management circuit 126 may select the searched map table entry as a target map table entry.

If a pattern of the data corresponding to the read command is a sequential pattern, the target map table entry corresponds to a mapping region that may be sequentially accessed in the semiconductor memory device 110. If a pattern of the data corresponding to the read command is not a sequential pattern, the target map table entry corresponds to a mapping region that may be randomly accessed in the semiconductor memory device 110.

A map table entry described in the embodiments of the disclosure may be configured in a style different from an existing map table entry to maximize the performance of the map table and the hit ratio of a map cache described below. The structures of the map table and map table entries in accordance with an embodiment are described below with reference to FIG. 4.

Because the map table needs to be maintained even in a power-off state, the map table is stored in the semiconductor memory device 110. However, if the controller 120 always accesses the map table stored in the semiconductor memory device 110 to read data from and write data to the semiconductor memory device 110, latency markedly increases.

Therefore, a scheme is generally used, in which the map table stored in the semiconductor memory device 110 is loaded to the RAM 124 and the controller 120 accesses the map table loaded to the RAM 124 in the process of reading/writing data, thereby reducing latency.

However, because the size of the RAM 124 is limited but the size of the entire map table is generally larger than the size of a memory region capable of being allocated in the RAM 124 to load the map table, the entire map table cannot be loaded to the RAM 124. For example, it is assumed that, for the map table which stores mapping information on a memory region of total 1024 GB, the size of one map table entry is 4 Bytes and a mapping region corresponding to one map table entry is 4 KB. In this case, while the size of the entire map table is (1024 GB/4 KB)*4=1 GB, but the size of a memory region capable of being allocated for the map table in the RAM 124 is several MB at maximum, i.e., considerably smaller than 1 GB.

Therefore, in order to solve this issue, the controller 120 configures a map cache in the RAM 124, and stores only some, not all of the, map table entries in the map table, in the map cache. The size of the map cache may be determined to be smaller than the size of the map table, and map table entries to be stored in the map cache may be dynamically determined.

If a selected target map table entry does not exist in the map cache, the map cache management circuit 126 stores the selected target map table entry in the map cache. As a consequence, by using the map cache, an advantage may be provided in that, in order to access a target map table entry, the controller 120 does not need to directly access the map table stored in the semiconductor memory device 110.

The entry eviction circuit 127 may evict some among the map table entries stored in the map cache, when storing a target map table entry in the map cache. As described above, since the map cache is configured to have a size smaller than the size of the map table due to the limited size of the RAM 124, when storing a target map table entry determined by the map cache management circuit 126 in the map cache, there may occur a case where a marginal space for storing the target map table entry does not exist in the map cache.

To store the target map table entry, some of the map table entries stored in the map cache are evicted from the map cache, and the target map table entry is newly stored in a region where an evicted map table entry is stored.

In this regard, a policy for determining which map table entry to be evicted among the map table entries already stored in the map cache is an eviction policy for the map cache.

For instance, the eviction policy may be LRU (least recently used). The LRU is a policy that determines a least recently referenced map table entry among the map table entries stored in the map cache as a target for eviction.

For another instance, the eviction policy may be MRU (most recently used). In contrast to the LRU policy, the MRU policy determines a most recently referenced map table entry among the map table entries stored in the map cache as a target for eviction.

For still another instance, the eviction policy may be FIFO (first in first out). The FIFO is a policy that determines a map table entry firstly stored in the map cache among the map table entries stored in the map cache as a target for eviction.

An eviction policy to be used for the entry eviction circuit 127 to determine a map table entry to be evicted from the map cache may be determined as in the following example. For instance, an eviction policy may be determined based on an input distribution of a plurality of commands received from the host 50 during a specific time period, which may be predetermined.

The input distribution may be determined to be a sequential input distribution or a random input distribution based on a ratio of commands of which patterns of corresponding data are sequential patterns, among the plurality of commands received during the specific time period.

A process in which an eviction policy is determined based on an input distribution of a plurality of commands received from the host 50 is described below in detail with reference to FIGS. 5 and 6.

For another instance, an eviction policy may be determined based on a hit ratio of the map cache in the case where different eviction policies are applied during different time periods. That is to say, the entry eviction circuit 127 may use an eviction policy that may maximally increase the hit ratio of the map cache, based on actually measured hit ratios of the map cache.

In detail, with respect to a first time period and a second subsequent time period, in the case where a hit ratio of the map cache when a first eviction policy is applied during the first time period is greater than a hit ratio of the map cache when a second eviction policy is applied during the second time period, an eviction policy to be applied to the map cache may be changed from the second eviction policy to the first eviction policy. A process in which an eviction policy is determined based on hit ratios of the map cache in the case where different eviction policies are applied during different time periods is described below with reference to FIG. 7.

The pattern determination circuit 125, the map cache management circuit 126 and the entry eviction circuit 127 described above may be integrated into one or more modules.

Also, the pattern determination circuit 125, the map cache management circuit 126 and the entry eviction circuit 127 may be realized by a single processing module which is integrated with the processor 122.

Further, the pattern determination circuit 125, the map cache management circuit 126 and the entry eviction circuit 127 may be realized in such a manner that the processor 122 executes firmware including a command which instructs operations of the pattern determination circuit 125, the map cache management circuit 126 and the entry eviction circuit 127.

A bus 128 may be configured to provide channels among the components of the controller 120.

Figure 2:
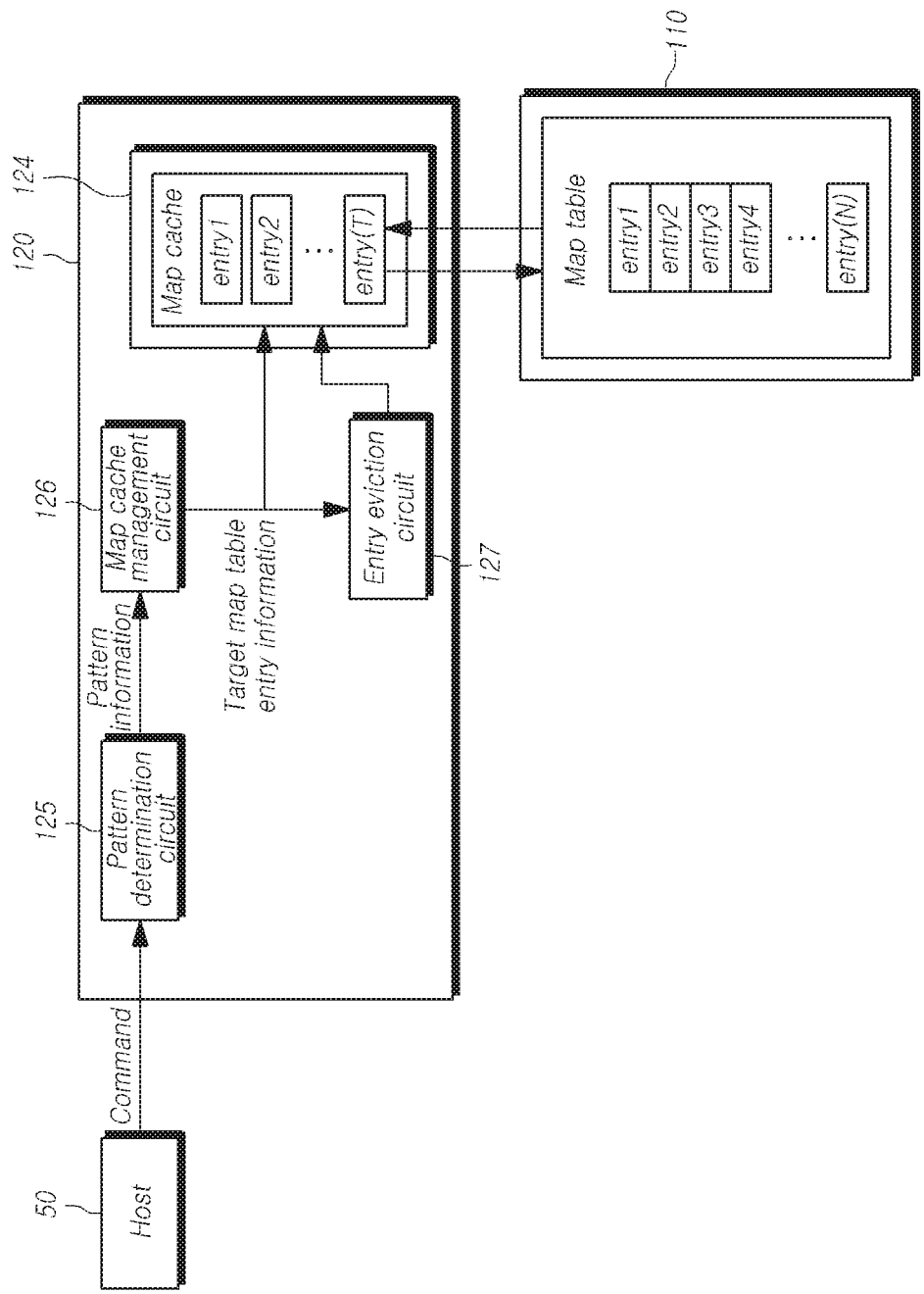
FIG. 2 is a diagram illustrating an operation of controlling a map cache depending on a command received from a host in accordance with an embodiment.

FIG. 2 is a diagram illustrating an operation of controlling the map cache depending on a command received from the host 50 in accordance with an embodiment.

Referring to FIG. 2, first, the pattern determination circuit 125 receives a command from the host 50 and determines a pattern of data corresponding to the received command. As described above with reference to FIG. 1, the corresponding command may be a nonvolatile memory express (NVMe) command, and may include information indicating whether a pattern of the data corresponding to the command is a sequential pattern.

The map cache management circuit 126 may determine a target map table entry corresponding to the command, in the map table, based on the pattern information of the data determined by the pattern determination circuit 125. Further, the map cache management circuit 126 may store the target map table entry in the map cache if the determined target map table entry does not exist in the map cache.

As described above with reference to FIG. 1, the map table is stored in the semiconductor memory device 110 to be maintained even in a power-off state, and the map cache is stored in the RAM 124 inside the controller 120. The map cache may store T map table entries at maximum among N total map table entries in the map table (where T<N).

The map cache management circuit 126 does not need to perform a separate operation when a target map table entry exists in the map cache. Instead, the map cache management circuit 126 may store a map table entry selected in the map table, in the map cache, when a target map table entry does not exist in the map cache.

In the case where the content of a map table entry stored in the map cache is updated due to a data write/erase operation or the like, the map table entry of which the content is updated may be updated to the map table in the semiconductor memory device 110.

A time when a map table entry stored in the map cache is updated to the map table may be determined as follows. For instance, a map table entry stored in the map cache may be updated every cycle or may be updated when a particular event occurs (for example, when a map table entry of which the content is changed is evicted from the map cache).

The entry eviction circuit 127 uses information on a target map table entry determined in the map cache management circuit 126, and evicts some map table entries stored in the map cache, when storing the target map table entry in the map cache.

As described above with reference to FIG. 1, if a marginal space exists in the map cache, no map table entry is evicted by the entry eviction circuit 127. However, in the case where no marginal space exists in the map cache, the entry eviction circuit 127 selects and evicts some among the map table entries stored in the map cache, according to an eviction policy. In the case where the content of a map table entry evicted from the map cache is changed, the evicted map table entry is updated to the map table, and if not changed, the map table entry is erased from the RAM 124.

Figure 3:
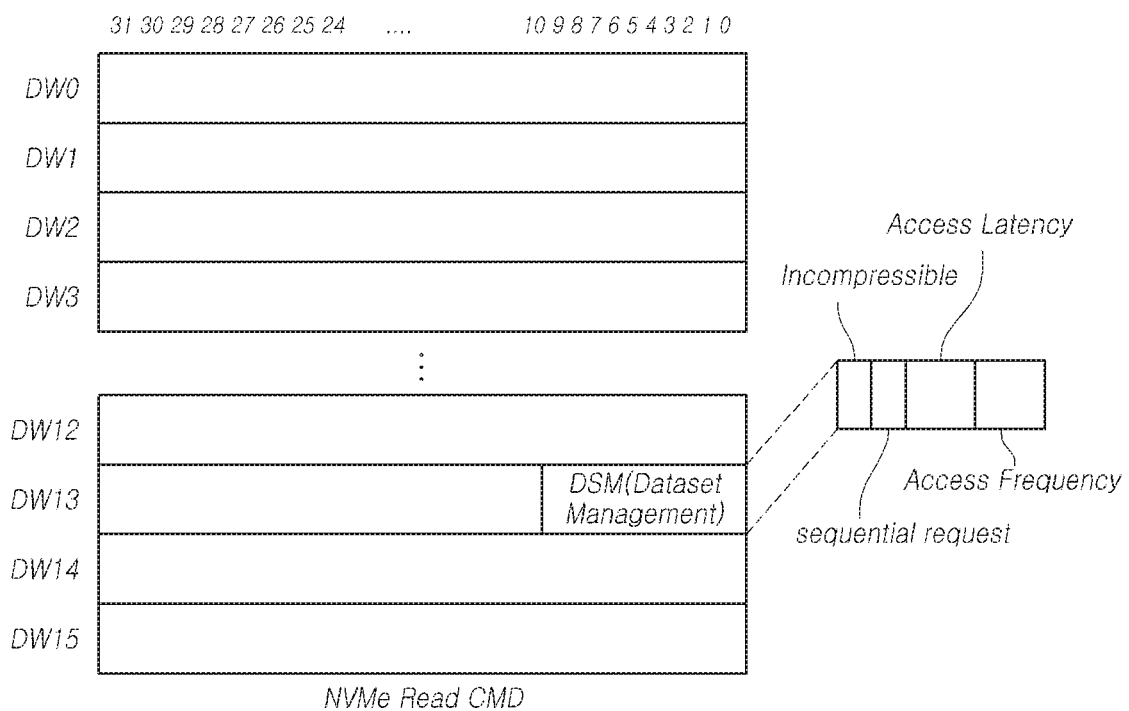
FIG. 3 is a diagram illustrating hint information of an NVMe command in accordance with an embodiment.

FIG. 3 is a diagram illustrating hint information of an NVMe command in accordance with an embodiment.

For instance, the structure of a nonvolatile memory express read command (NVMe Read CMD) is constituted by 16 DWORDs, where one DWORD is 4 bytes (or 32 bits). When denoting the 16 DWORDs as DW0, DW1, DW2, . . . , DW12, DW13, DW14 and DW15 in order, a field indicating a dataset management (DSM) information is included in DW13. The DSM information is a field indicating an attribute of a logical block address (LBA) mapped to data to be read.

In the DSM information, a sequential request field indicates information on whether a corresponding command is a target for sequential read. In the case where the sequential request field is 1, a corresponding command is target for sequential read. In the case where the sequential request field is 0, no information on whether a corresponding command is a target for sequential read is indicated.

The pattern determination circuit 125 may determine pattern of data corresponding to a command, by using the above-described information indicated by the sequential request field.

FIG. 4 is a diagram illustrating an example of configuring a map table and map table entries in accordance with an embodiment.

As shown in FIG. 4, the map table may include map table entries each including an entry number field (Entry No.), a logical address field (Logical Address), a physical address field (Physical Address) and a length field (Length). The entry number field indicates an index of a map table entry. The logical address field indicates a start address (logical start address) of a logical block address corresponding to a map table entry. The physical address field indicates a start address (physical start address) of a physical block address corresponding to a map table entry. The length field indicates a size (mapping size) of a mapping region as a memory region to be mapped between a logical block address and a physical block address in a map table entry.

In other words, a map table entry may include information on a physical start address and a size of a memory region corresponding to the map table entry. The unit of a memory region may be page, and the size of one page may be a set value of 2 KB, 4 KB, 8 KB, etc.

The description below is in the context of a page unit, where one page is set to 4 KB.

In the map table, in the case where logical block addresses and physical block addresses are not sequentially mapped as in map table entries having entry numbers 1, 2, 4, 5 and 6, one map table entry indicates that a size of one page is mapped between a logical block address and a physical block address, in a manner similar to an existing map table entry structure.

However, in the map table, a map table entry having an entry number 0 indicates that a size of 32768 pages (i.e., 32768*4 KB=128 MB) from page 0 as a logical start address is mapped to a memory region of a size of 32768 pages from page 10 as a physical start address. Further, in the map table, a map table entry having an entry number 3 indicates that a size of 32 pages (i.e., 32*4 KB=128 KB) from page 32770 as a logical start address is mapped to a memory region of a size of 32 pages from page 10002 as a physical start address.

Namely, as in the map table entries having the entry numbers 0 and 3, in the map table in accordance with an embodiment, in the case where logical block addresses and physical block addresses are sequentially mapped by a size of a plurality of pages, it is possible to represent an entire mapped memory region by one map table entry. This means that a memory region to which logical block addresses and physical block addresses are mapped may be represented by being compressed.

In this way, in the case where logical block addresses and physical block addresses are sequentially mapped by a size of a plurality of pages, as an entire mapped memory region may be indicated by being compressed as one map table entry, the size of the entire map table may be reduced, and the hit ratio of the map cache may be increased.

In detail, in an existing map table structure, a map table entry should be configured for each mapping unit (e.g., page) regardless of whether logical block addresses and physical block addresses are sequentially mapped.

For example, in the existing map table structure, in order to represent the mapping indicated by the entry number 0, map table entries should be configured for the 32768 pages, respectively.

However, in the map table structure described herein, because only one map table entry needs to be used instead of 32768 map table entries, an advantage is provided in that the size of an entire map table for indicating mapping information on the same memory region is reduced when compared to the size of an existing map table.

Moreover, when storing a map table entry for representing the mapping indicated by the entry number 0 in a map cache, 32768 map table entries should be stored in the map cache in the existing map table structure. However, in the map table structure described herein, only one map table entry needs to be stored in the map cache. Thus, since a marginal space of the map cache may be used for other map table entries, an advantage is provided in that the hit ratio of the map cache is increased.

In order to allow a map table entry to represent a mapping size of a mapping region corresponding to the map table entry as described above with reference to FIG. 4, a separate field may be additionally included in the map table entry.

For instance, a compression indicating field may be additionally included in a map table entry. If a corresponding compression indicating field has a first value (for example, 0), a corresponding map table entry may indicate that a size of one page is mapped between a logical block address and a physical block address. If a corresponding compression indicating field has a second value (for example, 1), a corresponding map table entry may indicate that a size of a plurality of pages is mapped between a logical block address and a physical block address.

In order to increase the hit ratio of the map cache, not only a map table structure may be changed as described above with reference to FIG. 4, but also an eviction policy of the map cache may be improved such that map table entries having high possibilities to be accessed are maximally stored in the map cache.

To this end, in accordance with an embodiment of the disclosure, a method for dynamically applying an eviction policy to be applied to a map cache is described. First, a method for determining an eviction policy to be applied to a map cache, based on an input distribution of a plurality of commands received during a specific time period, is described below.

Figure 5:
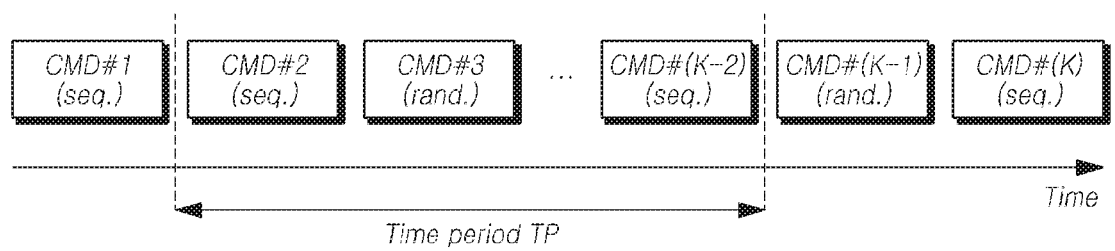
FIG. 5 is a diagram illustrating an operation of checking an input distribution of a plurality of commands received during a particular time period in accordance with an embodiment.

FIG. 5 is a diagram illustrating an operation of checking an input distribution of a plurality of commands received during a specific time period in accordance with an embodiment.

It is assumed that a plurality of commands CMD #1, CMD #2, CMD #3, CMD #(K−2), CMD #(K−1) and CMD #(K) are received from the host 50. The plurality of commands may be NVMe commands as described above. The commands CMD #1, CMD #2, CMD #(K−2) and CMD #(K) may include information indicating whether a pattern of data of the corresponding command is a sequential pattern "seq.". The commands CMD #3 and CMD #(K−1) may include information indicating whether a pattern of data of a corresponding command is a random pattern "rand.".

Patterns of data corresponding to the respective commands may be determined by the pattern determination circuit 125 of FIG. 1.

An eviction policy to be applied to a map cache may be determined based on an input distribution of commands CMD #2, CMD #3, . . . and CMD #(K−2) received during a specific time period TP, which may be predetermined.

The time period TP may be repeated with a cycle. Also, the time period TP may be started in the case where it is determined that an eviction policy needs to be newly determined based on information on a hit ratio of the map cache or the like.

Figure 6:
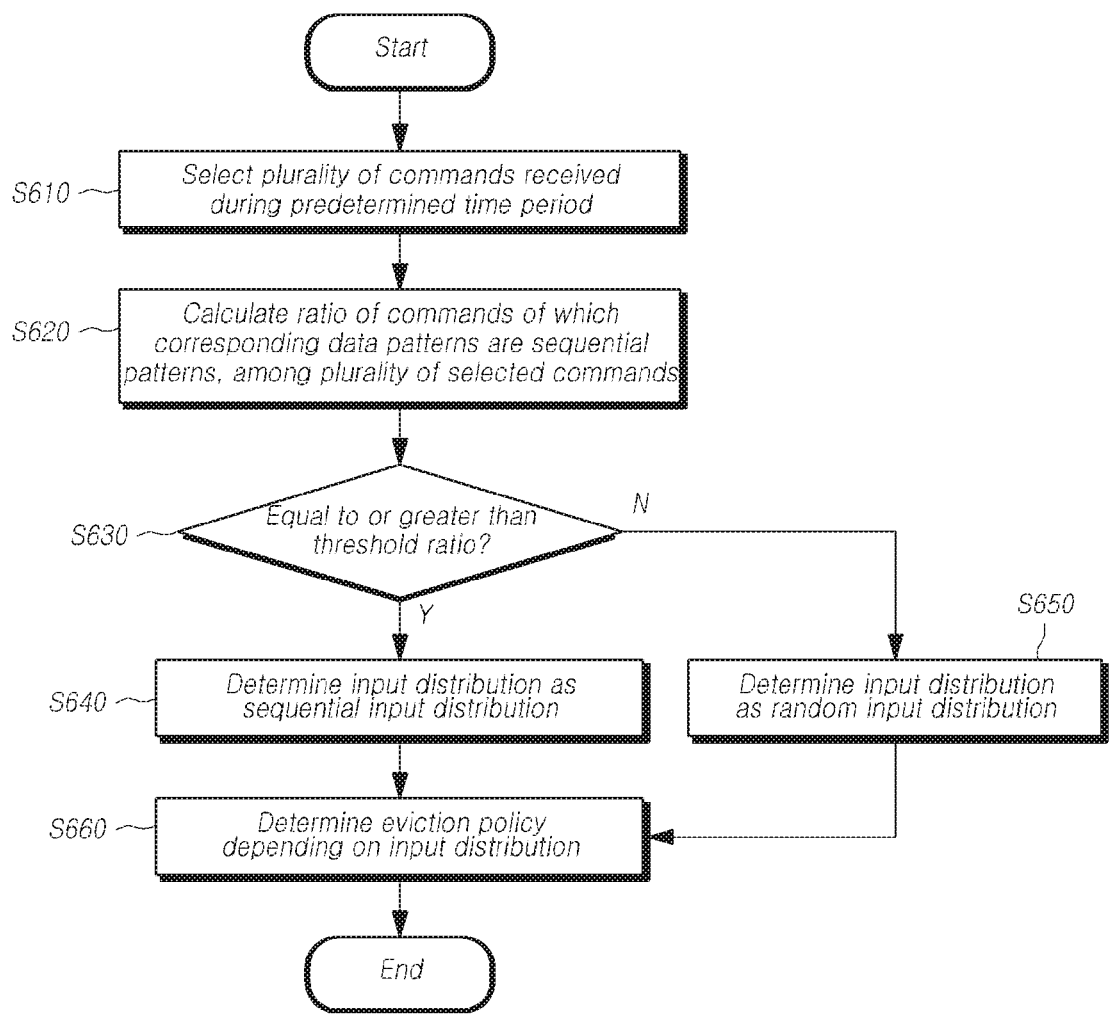
FIG. 6 is a flow chart illustrating a process in which an eviction policy to be applied to a map cache is determined by using an input distribution of a plurality of commands received during a particular time period in accordance with an embodiment.

FIG. 6 is a flow chart illustrating a process in which an eviction policy to be applied to a map cache is determined based on an input distribution of a plurality of commands received during a specific time period in accordance with an embodiment.

The process is described below in the context of being executed by the entry eviction circuit 127 described above with reference to FIG. 1.

Referring to FIG. 6, the entry eviction circuit 127 selects a plurality of commands received during a specific time period (S610).

Thereafter, the entry eviction circuit 127 calculates the ratio of commands of which patterns of corresponding data are sequential patterns, among the commands selected at the step S610 (S620). Whether a pattern of data corresponding to a command is a sequential pattern or not may be determined by the pattern determination circuit 125. For example, if 10 commands are selected during a specific time period, patterns of data corresponding to 7 of those 10 commands are sequential patterns and patterns of data corresponding to remaining 3 commands are random patterns, the ratio becomes 0.7 (=7/10).

The entry eviction circuit 127 determines whether the ratio calculated at the step S620 is greater than or equal to a set threshold ratio (S630).

If the ratio calculated at the step S620 is greater than or equal to the set threshold ratio (S630, Y), the entry eviction circuit 127 may determine that patterns of data corresponding to the commands received from the host 50 are mainly sequential patterns. Accordingly, the input distribution may be determined to be a sequential input distribution (S640).

On the other hand, if the ratio calculated at the step S620 is less than the set threshold ratio (S630, N), the entry eviction circuit 127 may determine that patterns of data corresponding to the commands received from the host 50 are mainly random patterns. Accordingly, the input distribution may be determined to be a random input distribution (S650).

At step S660, the entry eviction circuit 127 determines an eviction policy according to the input distribution determined at step S640 or step S650.

For instance, in the case where the input distribution is determined to be the sequential input distribution, the entry eviction circuit 127 may determine an eviction policy to be the LRU (least recently used) or the MRU (most recently used).

The fact that an input distribution is a sequential input distribution means that a possibility for map table entries corresponding to sequential memory regions to be hit in the map cache is high. Thus, the entry eviction circuit 127 may determine the LRU as an eviction policy such that map table entries having a high possibility to be hit may be stored in the map cache as long as possible.

Further, the fact that an input distribution is a sequential input distribution means that data may be sequentially accessed and data accessed once has a low possibility to be immediately accessed again. Thus, the entry eviction circuit 127 may determine the MRU instead of the LRU as an eviction policy.

For another instance, in the case where an input distribution is a random input distribution, the entry eviction circuit 127 may determine an eviction policy as the FIFO (first in first out). The fact that an input distribution is a random input distribution means that it is impossible to predict which map table entry will be hit among map table entries stored in the map cache. Thus, the entry eviction circuit 127 may determine the FIFO as an eviction policy such that times during which the map table entries are stored in the map cache are maximally uniform.

In the case where different eviction policies are applied during different time periods, an eviction policy may be determined based on a hit ratio of the map cache.

Figure 7:
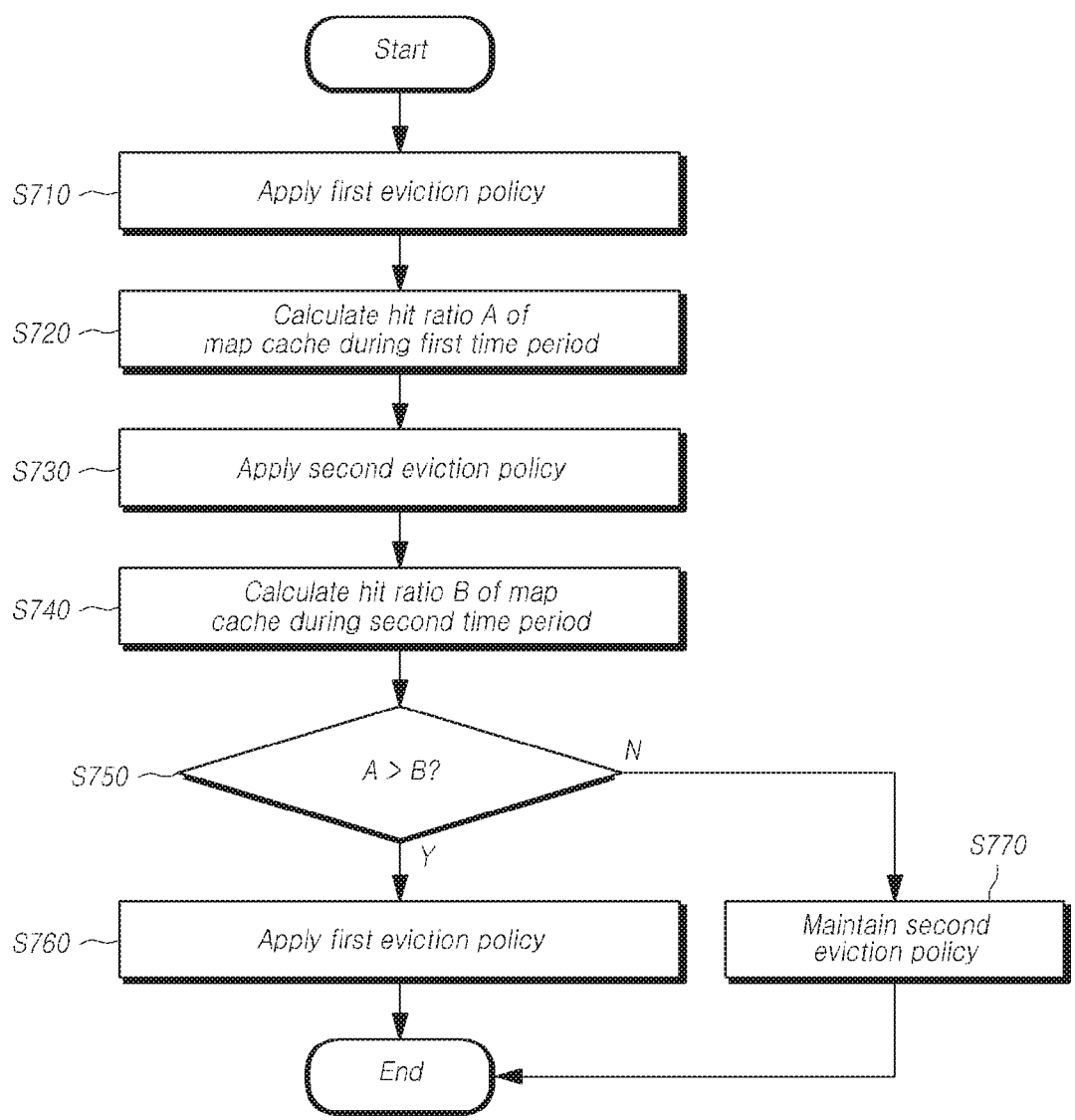
FIG. 7 is a flow chart illustrating a process in which an eviction policy to be applied to a map cache is determined by comparing a hit ratio of the map cache during a first time period and a hit ratio of the map cache during a second time period in accordance with an embodiment.

FIG. 7 is a flow chart illustrating a process in which an eviction policy to be applied to the map cache is determined by comparing a hit ratio of the map cache during a first time period and a hit ratio of the map cache during a second time period in accordance with an embodiment.

The process is described below as being executed by the entry eviction circuit 127 described above with reference to FIG. 1.

Referring to FIG. 7, first, the entry eviction circuit 127 may apply a first eviction policy as an eviction policy for the map cache (S710). The first eviction policy may be set in advance or determined through the process described above with reference to FIG. 6.

The entry eviction circuit 127 calculates a hit ratio A of the map cache during a first time period, in a state in which the first eviction policy is applied (S720).

Thereafter, the entry eviction circuit 127 may newly apply a second eviction policy as an eviction policy for the map cache (S730). The second eviction policy may also be set in advance or determined through the process described above with reference to FIG. 6.

The entry eviction circuit 127 calculates a hit ratio B of the map cache during a second time period, in a state in which the second eviction policy is applied (S740).

Then, the entry eviction circuit 127 compares the hit ratio A calculated at the step S720 and the hit ratio B calculated at the step S740 (S750).

Since the case where the hit ratio A is greater than the hit ratio B (S750, Y) means that the first eviction policy is more efficient than the second eviction policy, the entry eviction circuit 127 may apply the first eviction policy instead of the second eviction policy as an eviction policy for the map cache (S760). In this case, the entry eviction circuit 127 may cause the first eviction policy to be always maintained as an eviction policy, thereby reducing an overhead occurring in the case where an eviction policy is changed.

On the other hand, since the case where the hit ratio B is greater than or equal to the hit ratio A (S750, N) means that the second eviction policy is more efficient than the first eviction policy, the entry eviction circuit 127 may maintain the second eviction policy as it is as an eviction policy for the map cache (S770).

The process described above with reference to FIG. 7 may be applied to the case where a hit ratio of the map cache does not increase by an eviction policy determined based on an input distribution of commands received from the host 50.

For example, if an eviction policy to be applied to the map cache is changed from the FIFO to the LRU as commands of sequential patterns are mainly received from the host 50 but a hit ratio of the map cache does not actually increase, an eviction policy may be recovered again to the FIFO instead of maintaining the inefficient LRU, through the process described above with reference to FIG. 7, thereby increasing a hit ratio of the map cache.

Figure 8:
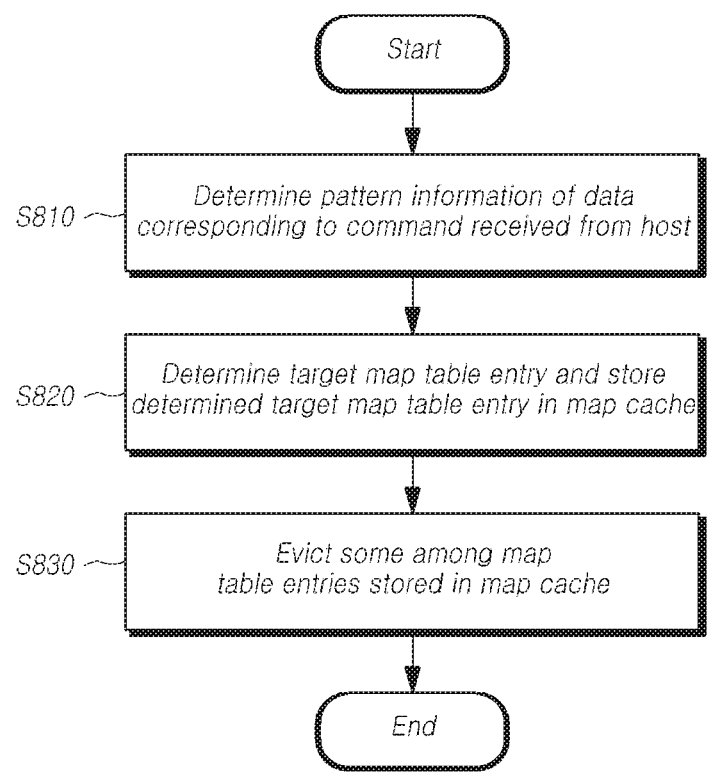
FIG. 8 is a flow chart illustrating a method for operating a controller in accordance with an embodiment.

FIG. 8 is a flow chart illustrating a method for operating the controller 120 in accordance with embodiments.

The method is described below in the context of being executed by the controller 120 in the storage device 100 described above with reference to FIG. 1.

Referring to FIG. 8, the pattern determination circuit 125 of the controller 120 may determine pattern information of data corresponding to a command received from the host 50 (S810). The command received from the host 50 may include information indicating whether a pattern of the data corresponding to the command is a sequential pattern or not.

The map cache management circuit 126 of the controller 120 determines a target map table entry among the map table entries of the map table depending on the pattern information determined at the step S810. If the target map table entry does not exist in the map cache, the map cache management circuit 126 may store the target map table entry in the map cache (S820). Here, the configurations of the map table and the map table entries may be applied in the same as those described above with reference to FIG. 4.

Further, when storing a map table entry in the map cache, the entry eviction circuit 127 of the controller 120 may evict some among the map table entries stored in the map cache. As a detailed process in which the entry eviction circuit 127 determines an eviction policy to be used to evict some among the map table entries, the processes described above with reference to FIGS. 6 and 7 may be applied in the same manner.

Through the above-described embodiments of the disclosure, a storage device, a controller and a method for operating a controller capable of maximizing the hit ratio of a map cache may be provided.

Also, embodiments of the disclosure may provide a storage device, a controller and a method for operating a controller capable of improving the performance of a map table through maximizing the ratio of a size of a memory region to be mapped with respect to a size of the map table.

Although various embodiments have been illustrated and described, those skilled in the art will appreciate in light of the present disclosure that various modifications, additions and substitutions are possible, without departing from the scope and spirit of the disclosure. Therefore, the disclosed embodiments should be considered in a descriptive sense only and not for limiting the scope of the invention. The scope of the invention is defined by the claims and their equivalents.

What is claimed is:

1. A controller suitable for controlling a semiconductor memory device, comprising:
a pattern determination circuit configured to determine a pattern of data corresponding to a command received from a host based on the command having a request field indicating whether or not the pattern of data is sequential;
a map cache management circuit configured to determine a target map table entry among map table entries of a map table based on the pattern, and store, when the target map table entry does not exist in a map cache which stores some of the map table entries, the target map table entry in the map cache; and
an entry eviction circuit configured to evict at least one among the map table entries in the map cache, when storing the target map table entry in the map cache,
wherein the entry eviction circuit evicts the at least one among the map table entries in the map cache, according to an eviction policy determined based on an input distribution of a plurality of commands received from the host during a specific time period, and
wherein the input distribution is determined based on a ratio of commands of which patterns of corresponding data are sequential patterns.

2. The controller of claim 1, wherein the command is a nonvolatile memory express (NVMe) command.

3. The controller of claim 1, wherein the command includes information indicating whether the pattern of the data corresponding to the command is a sequential pattern or not.

4. The controller of claim 1, wherein the target map table entry includes information on a physical start address and a mapping size of a mapping region corresponding to the target map table entry.

5. The controller of claim 4, wherein the information on the physical start address and the mapping size are indicated by a unit of a page.

6. The controller of claim 1, wherein the input distribution of the plurality of commands is determined as a sequential input distribution in the case where the ratio of commands of which patterns of corresponding data are sequential patterns is greater than or equal to a set threshold ratio, among the plurality of commands, and is determined as a random input distribution in the case where the ratio of the commands is less than the threshold ratio.

7. The controller of claim 6, wherein the eviction policy is an LRU (least recently used) policy or an MRU (most recently used) policy in the case where the input distribution is the sequential input distribution.

8. The controller of claim 6, wherein the eviction policy is a FIFO (first in first out) policy in the case where the input distribution is the random input distribution.

9. The controller of claim 1, wherein, with respect to a first time period and a second time period after the first time period, in the case where a hit ratio of the map cache during the first time period is greater than a hit ratio of the map cache during the second time period, an eviction policy to be applied to the map cache is changed to an eviction policy applied to the map cache during the first time period.

10. A storage device comprising:

a semiconductor memory device; and a controller configured to control the semiconductor memory device, wherein the controller comprises:

a pattern determination circuit configured to determine a pattern of data corresponding to a command received from a host based on the command having a request field indicating whether or not the pattern of data is sequential;

a map cache management circuit configured to determine a target map table entry among map table entries of a map table based on the pattern information, and store, when the target map table entry does not exist in a map cache which stores some of the map table entries, the target map table entry in the map cache; and an entry eviction circuit configured to evict at least one among the map table entries in the map cache, when storing the target map table entry in the map cache, wherein the entry eviction circuit evicts the at least one among the map table entries in the map cache, according to an eviction policy determined based on an input distribution of a plurality of commands received from the host during a specific time period, and wherein the input distribution is determined based on a ratio of commands of which patterns of corresponding data are sequential patterns.

11. The storage device of claim 10, wherein the command includes an information indicating whether the pattern of the data corresponding to the command is a sequential pattern or not.

12. The storage device of claim 10, wherein the target map table entry includes information on a physical start address and a mapping size of a mapping region corresponding to the target map table entry.

13. A method for operating a controller which controls a semiconductor memory device, comprising:

determining a pattern of data corresponding to a command received from a host based on the command having a request field indicating whether or not the pattern of data is sequential;

determining a target map table entry among map table entries of a map table based on the pattern information, and storing, when the target map table entry does not exist in a map cache which stores some of the map table entries, the target map table entry in the map cache; and evicting at least one among the map table entries in the map cache, when storing the target map table entry in the map cache, wherein the evicting of the some among the map table entries in the map cache comprises evicting the at least one among the map table entries in the map cache, according to an eviction policy determined based on an input distribution of a plurality of commands received from the host during a specific time period, and wherein the input distribution is determined based on a ratio of commands of which patterns of corresponding data are sequential patterns.

14. The method of claim 13, wherein the command includes information indicating whether the pattern of the data corresponding to the command is a sequential pattern or not.

15. The method of claim 13, wherein the target map table entry includes information on a physical start address and a mapping size of a mapping region corresponding to the target map table entry.

* * * * *